(12) United States Patent
Ambroise

(10) Patent No.: US 11,247,440 B2
(45) Date of Patent: Feb. 15, 2022

(54) METALLIZED, ORIENTED, LINEAR, LOW-DENSITY, POLYETHYLENE FILMS

(71) Applicant: Jindal Films Americas LLC, LaGrange, GA (US)

(72) Inventor: Benoît Ambroise, Norbressart (BE)

(73) Assignee: Jindal Innovation Center SRL, Virton (BE)

( * ) Notice: Subject to any disclaimer, the term of this patent is extended or adjusted under 35 U.S.C. 154(b) by 273 days.

(21) Appl. No.: 15/975,578

(22) Filed: May 9, 2018

(65) Prior Publication Data

US 2018/0257348 A1   Sep. 13, 2018

Related U.S. Application Data

(63) Continuation of application No. PCT/US2016/062788, filed on Nov. 18, 2016.
(Continued)

(51) Int. Cl.

| | |
|---|---|
| B32B 27/00 | (2006.01) |
| B32B 27/08 | (2006.01) |
| B32B 27/32 | (2006.01) |
| B32B 27/20 | (2006.01) |
| B32B 27/30 | (2006.01) |
| B29C 55/12 | (2006.01) |
| B32B 27/16 | (2006.01) |
| B32B 7/12 | (2006.01) |
| B32B 27/36 | (2006.01) |
| B65D 65/40 | (2006.01) |
| B65D 65/42 | (2006.01) |
| B29C 48/08 | (2019.01) |

(Continued)

(52) U.S. Cl.
CPC .............. *B32B 27/08* (2013.01); *B29C 55/12* (2013.01); *B32B 7/12* (2013.01); *B32B 27/16* (2013.01); *B32B 27/20* (2013.01); *B32B 27/205* (2013.01); *B32B 27/306* (2013.01); *B32B 27/308* (2013.01); *B32B 27/32* (2013.01); *B32B 27/322* (2013.01); *B32B 27/327* (2013.01); *B32B 27/36* (2013.01); *B65D 65/40* (2013.01); *B65D 65/42* (2013.01); *B29C 48/0018* (2019.02); *B29C 48/08* (2019.02); *B29C 48/21* (2019.02); *B29C 55/06* (2013.01); *B29C 55/143* (2013.01); *B29K 2023/0625* (2013.01); *B29K 2105/0005* (2013.01); *B29K 2995/0053* (2013.01); *B29K 2995/0067* (2013.01); *B29K 2995/0069* (2013.01); *B29K 2995/0077* (2013.01); *B32B 2250/03* (2013.01); *B32B 2250/242* (2013.01); *B32B 2250/246* (2013.01); *B32B 2255/10* (2013.01); *B32B 2255/205* (2013.01); *B32B 2255/28* (2013.01); *B32B 2264/025* (2013.01); *B32B 2264/0257* (2013.01); *B32B 2264/0264* (2013.01); *B32B 2264/0285* (2013.01); *B32B 2264/10* (2013.01); *B32B 2264/102* (2013.01); *B32B 2264/104* (2013.01); *B32B 2264/108* (2013.01); *B32B 2307/31* (2013.01); *B32B 2307/40* (2013.01); *B32B 2307/41* (2013.01); *B32B 2307/518* (2013.01); *B32B 2307/54* (2013.01); *B32B 2307/72* (2013.01); *B32B 2307/7244* (2013.01); *B32B 2307/7246* (2013.01); *B32B 2307/7265* (2013.01); *B32B 2307/732* (2013.01); *B32B 2307/748* (2013.01); *B32B 2439/46* (2013.01); *B32B 2439/70* (2013.01); *B32B 2553/00* (2013.01)

(58) Field of Classification Search
CPC ....... B32B 27/08; B32B 27/32; B32B 27/327; C08F 10/02; C08F 110/02; C08F 210/02; C08L 23/04; C08L 23/06; C08L 23/08; C08L 23/0815

See application file for complete search history.

(56) References Cited

U.S. PATENT DOCUMENTS

| | | | |
|---|---|---|---|
| 4,345,005 A * | 8/1982 | All .......................... | B32B 27/32 428/461 |
| 6,248,442 B1 | 6/2001 | Kong et al. | |

(Continued)

FOREIGN PATENT DOCUMENTS

| | | | | |
|---|---|---|---|---|
| JP | 2004238543 A | | 8/2004 | |
| WO | WO-2013141918 A1 * | 9/2013 | ......... | C23C 14/0042 |

OTHER PUBLICATIONS

Blaine R. Copenheaver, ISR and WO for PCTUS1662788, dated Feb. 2, 2017 (n.b. claim 15 found allowable and incorporated into claim 1 in present application).

*Primary Examiner* — Zachary M Davis
(74) *Attorney, Agent, or Firm* — Rao Deboer Osterrieder, PLLC; Erik J. Osterrieder

(57) ABSTRACT

Disclosed are compositions, methods and uses for thin multi-layered films that may include a metallizable skin layer that include polyethylene polymer(s), wherein the metallizable skin layer may be treated one or more times. The multi-layered films include a core layer and a sealant layer, wherein each of these layers includes metallocene-catalyzed, linear, low-density polyethylene. The core layer is located between the metallizable skin layer and the sealant layer. These films may include one or more additives in any of the layers and/or include one or more tie layers. The multi-layered films may be biaxially oriented, have a haze equal to or below 5%, and have an elastic modulus equal to or below 350 N/mm². The multi-layered films may also include a metallized layer on the metallizable skin layer, a coated layer on the metallizable skin layer, and/or be laminated to a polyethylene-based polymer, such as polyethylene terephthalate.

20 Claims, No Drawings

Related U.S. Application Data

(60) Provisional application No. 62/257,079, filed on Nov. 18, 2015.

(51) Int. Cl.

| | | |
|---|---|---|
| B29C 48/00 | (2019.01) | |
| B29C 48/21 | (2019.01) | |
| B29C 55/06 | (2006.01) | |
| B29C 55/14 | (2006.01) | |
| B29K 23/00 | (2006.01) | |
| B29K 105/00 | (2006.01) | |

(56) References Cited

U.S. PATENT DOCUMENTS

| | | |
|---|---|---|
| 8,080,294 B2 | 12/2011 | Lu |
| 2003/0124370 A1* | 7/2003 | Suzuki .................. B32B 27/32 428/515 |
| 2011/0132975 A1* | 6/2011 | Toft ....................... C23C 14/20 229/5.84 |
| 2011/0143070 A1* | 6/2011 | Toft ....................... B32B 27/36 428/36.92 |
| 2012/0263960 A1 | 10/2012 | Song et al. |
| 2013/0212983 A1 | 8/2013 | Bender et al. |
| 2015/0258756 A1 | 9/2015 | Lu |
| 2015/0298861 A1 | 10/2015 | Dabadie et al. |
| 2018/0104938 A1* | 4/2018 | Tomatsu ............. C08L 23/0815 |
| 2018/0104942 A1* | 4/2018 | Shen .................... B32B 33/00 |

* cited by examiner

METALLIZED, ORIENTED, LINEAR, LOW-DENSITY, POLYETHYLENE FILMS

REFERENCE TO RELATED APPLICATION

The present application is a continuation application, which claims priority to Patent Cooperation Treaty (PCT) application PCT/US16/62788 filed on Nov. 18, 2016, which claims priority to the U.S. provisional patent application Ser. No. 62/257,079 filed Nov. 18, 2015, wherein both of these priority applications are incorporated in their entireties and were titled the same as this application.

FIELD

This disclosure relates to thin, metallized, oriented, multilayer films containing linear, low-density polyethylene.

BACKGROUND

Cast or blown unoriented polyethylene (PE) or polypropylene (PP) films are broadly used as sealants in packaging or other applications. Such films generally have mediocre physical properties, and, consequently, are combined with other web materials, such as paper, polyethylene terephthalate (PET), biaxially oriented (BO) polypropylene (PP), polyamides such as nylon, aluminum foil, or other material in order to provide additional mechanical properties such as stiffness, strength, and puncture resistance, and barrier protection. This disclosure provides for new multilayered films and methods therefor that combine barrier protection with enhanced sealing properties, e.g., high seal strengths, remarkable hermetic seals, and significant seal-through-contamination in the sealing area, for example fluids, oils, powders or fibers. Moreover, these new multilayered films provide barrier protection with enhanced sealing properties at reduced thicknesses, a result that translates into a reduced amount of packaging while providing the same or improved performances. Accordingly, this disclosure relates to new, thin, oriented, linear, low-density polyethylene (LLDPE), multilayered films that withstand metallization and provide the above-discussed sealing and barrier properties.

SUMMARY

Disclosed are compositions, methods and uses for thin multi-layered films that may include a metallizable skin layer that include polyethylene polymer(s), wherein the metallizable skin layer may be treated one or more times. The multi-layered films include a core layer and a sealant layer, wherein each of these layers includes metallocene-catalyzed, linear, low-density polyethylene. The core layer is located between the metallizable skin layer and the sealant layer. These films may include one or more additives in any of the layers and/or include one or more tie layers. The multi-layered films may be biaxially oriented, have a haze equal to or below 5%, and have an elastic modulus equal to or below 350 N/mm$^2$. The multi-layered films may also include a metallized layer on the metallizable skin layer, a coated layer on the metallizable skin layer, and/or be laminated to a polyethylene-based polymer, such as polyethylene terephthalate.

DETAILED DESCRIPTION

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are described now, including exemplary embodiments and definitions that are adopted herein for purposes of understanding. While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

As used herein, "plastomer" is defined as a propylene-based or ethylene-based copolymer having a density in the range of 0.850 g/cm$^3$ to 0.920 g/cm$^3$ and a DSC melting point of at least 40° C.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

In various embodiments, disclosed are multilayered films, typically a polymeric film having improved sealing properties, comprising a core layer, optionally one or more tie layers intermediate on one or both sides of the core, a sealant layer on at least one side of the core (or tie layer(s) if present), and, a metallizable layer, which may be treated and metallized, and optionally have polymer coating(s), whether with or without primer(s).

Core Layer

As is known to those skilled in the art, the core layer of a multilayered film is most commonly the thickest layer and provides the foundation of the multilayered structure. In some embodiments, the core layer consists essentially of linear, low-density polyethylene (LLDPE) and is substantially free from other components. In alternate embodiments, the core may also contain lesser amounts of additional polymer(s) selected from the group consisting of ethylene polymer, ethylene-propylene copolymers, ethylene-propylene-butene terpolymers, elastomers, plastomers, different types of metallocene-LLDPEs (m-LLDPEs), and combinations thereof. Although not limiting in any way, suitable types of m-LLDPEs may have a melting index from 1 to 3, a density of 0.915 to 0.930 g/cm$^3$, and a melting peak of 115 to 135° C.

The core layer may further include a hydrocarbon resin. Hydrocarbon resins may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight less than 5000, preferably less than 2000, most preferably in the range of from 500 to 1000. The resin can be natural or synthetic and may have a softening point in the range of from 60° C. to 180° C.

Suitable hydrocarbon resins include, but are not limited to petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

The amount of such hydrocarbon resins, either alone or in combination, in the core layer is preferably less than 20 wt %, more preferably in the range of from 1 wt % to 5 wt %, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 10 wt %, based on the total weight of the core layer.

Preferably, the total amount of additives in the core layer comprises up to about 20 wt % of the core layer, but some embodiments may comprise additives in the core layer in an amount up to about 30 wt % of the core layer.

The core layer preferably has a thickness in the range of from about 5 μm to 100 more preferably from about 5 μm to 50 most preferably from 5 μm to 25 μm.

Tie Layer(s)

Tie layer(s) of a multilayered film is typically used to connect two other layers of the multilayered film structure, e.g., a core layer and a sealant layer, and is positioned intermediate these other layers. The tie layer(s) may have the same or a different composition as compared to the core layer.

In some embodiments, the tie layer is in direct contact with the surface of the core layer. In other embodiments, another layer or layers may be intermediate the core layer and the tie layer. The tie layer may comprise one or more polymers. In addition, the polymers may include $C_2$ polymers, maleic-anhydride-modified polyethylene polymers, $C_3$ polymers, $C_2C_3$ random copolymers, $C_2C_3C_4$ random terpolymers, heterophasic random copolymers, $C_4$ homopolymers, $C_4$ copolymers, metallocene polymers, propylene-based or ethylene-based elastomers and/or plastomers, ethyl-methyl acrylate (EMA) polymers, ethylene-vinyl acetate (EVA) polymers, polar copolymers, and combinations thereof. For example, one polymer may be a grade of VISTAMAXX™ polymer (commercially available from ExxonMobil Chemical Company of Baytown, Tex.), such as VM6100 and VM3000 grades. Alternatively, suitable polymers may include VERSIFY™ polymer (commercially available from The Dow Chemical Company of Midland, Mich.), Basell CATALLOY™ resins such as ADFLEX™ T100F, SOFTELL™ Q020F, CLYRELL™ SM1340 (commercially available from Basell Polyolefins of The Netherlands), PB (propylene-butene-1) random copolymers, such as Basell PB 8340 (commercially available from Basell Polyolefins of The Netherlands), Borealis BORSOFT™ SD233CF, (commercially available from Borealis of Denmark), EXCEED™ 1012CA and 1018CA metallocene polyethylenes, EXACT™ 5361, 4049, 5371, 8201, 4150, 3132 polyethylene plastomers, EMCC 3022.32 low density polyethylene (LDPE) (commercially available from ExxonMobil Chemical Company of Baytown, Tex.).

In some embodiments, the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer is typically in the range of from about 0.50 to 25 preferably from about 0.50 μm to 12 more preferably from about 0.50 μm to 6 and most preferably from about 2.5 μm to 5 However, in some thinner films, the tie layer thickness may be from about 0.5 μm to 4 or from about 0.5 μm to 2 or from about 0.5 μm to 1.5 μm.

Sealant Layer

In some embodiments, the sealant layer is contiguous to the core layer. Furthermore, the sealant layer may be on one or both sides of the core layer, and each sealant layer may have the same or a different composition. In addition, each sealant layer may have the same or different composition as compared to the core. In still other embodiments, one or more other layers may be intermediate the core layer and the sealant layer. The sealant layer includes a polymer that is suitable for heat-sealing or bonding to itself when crimped between heated crimp-sealer jaws. Suitable sealant layers include one or more polymers, including homopolymers, copolymers of ethylene, propylene, butene, hexene, heptene, octene, and combinations thereof. Additionally and alternatively, the suitable sealant layer composition has a melting peak equal to or less than the melting peak of the core layer. More particularly, the sealant layer may comprise at least one polymer selected from the group consisting of ethylene-propylene-butylene (EPB) terpolymer, ethylene vinyl acetate (EVA), metallocene-catalyzed ethylene, LLDPE, ionomer, polyethylene elastomer, plastomer, and combinations thereof.

The sealant layer may also comprise processing aid additives, such as anti-block agents, anti-static agents, slip agents and combinations thereof, as discussed in further detail below.

The thickness of the sealant layer is typically in the range of from about 0.10 μm to 7.0 preferably about 0.10 μm to 4 and most preferably about 1 μm to 3 In some film embodiments, the sealant layer thickness may be from about 0.10 μm to 2 μm, 0.10 μm to 1 or 0.10 μm to 0.50 In some commonly preferred film embodiments, the sealant layer has a thickness in the range of from about 0.5 μm to 2 μm, 0.5 μm to 3 or 1 μm to 3.5 μm.

Metallizable and Other Skin Layers

The multilayered films may be primed, coated and then metallized. A metallizable skin layer, also referred to as metallized layer, may be contiguous to the core layer and is on the side of the core layer that is opposite of the sealant layer. Tie layer(s) may exist between the core layer and the metallizable layer. For example, the outer surface (i.e., side facing away from the core) of the skin layer, which is on the opposite side of the core as compared to the sealant layer, may undergo metallization after optionally being treated. Metallization may be carried out through conventional methods, such as vacuum metallization by deposition of a metal layer such as aluminum, copper, silver, chromium, or mixtures thereof.

Skin layer(s) may be provided to improve the film's barrier properties, processability, printability, and/or compatibility for coating, metallizing, and laminating to other films or substrates.

In some embodiments, the skin layer comprises at least one polymer selected from the group consisting of a polyethylene polymer or copolymer, a polypropylene polymer or copolymer, an ethylene-propylene copolymer, an ethylene-propylene-butene terpolymer, a propylene-butene copolymer, an ethylene-vinyl alcohol polymer, polyamide polymer or copolymer, and combinations thereof. Preferably, the polyethylene polymer is high-density polyethylene (HDPE), such as HD-6704.67 (commercially available from Exxon-Mobil Chemical Company of Baytown, Tex.), M-6211 and HDPE M-6030 (commercially available from Equistar Chemical Company of Houston, Tex.). A suitable ethylene-propylene copolymer is Fina 8573 (commercially available from Fina Oil Company of Dallas, Tex.). Preferred EPB terpolymers include Chisso 7510 and 7794 (commercially available from Chisso Corporation of Japan). For coating and printing functions, the skin layer may preferably comprise a copolymer that has been surface treated. For metallizing or barrier properties, an HDPE or EVOH polymer may be preferred, such as one that has a melting peak of less than 160° C.

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.50 µm to 3.5 preferably from about 0.50 µm to 2 and in many embodiments most preferably from about 0.50 µm to 1.5 Also, in thinner film embodiments, the skin layer thickness may range from about 0.50 µm to 1.0 or 0.50 µm to 0.75 µm.

Additives

Additives that may be present in one or more layers of the multilayered films, include, but are not limited to opacifying agents, pigments, colorants, cavitating agents, slip agents, antioxidants, anti-fog agents, anti-static agents, anti-block agents, fillers, moisture barrier additives, gas barrier additives, gas scavengers, and combinations thereof. Such additives may be used in effective amounts, which vary depending upon the property required.

Examples of suitable opacifying agents, pigments or colorants are iron oxide, carbon black, aluminum, titanium dioxide ($TiO_2$), calcium carbonate ($CaCO_3$), and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 µm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is erucamide.

Non-migratory slip agents, used in one or more skin layers of the multilayered films, may include polymethyl methacrylate (PMMA). The non-migratory slip agent may have a mean particle size in the range of from about 0.5 µm to 8 µm, or 1 µm to 5 µm, or 2 µm to 4 µm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives may include effective amounts of low-molecular weight resins, hydrocarbon resins, particularly petroleum resins, styrene resins, cyclopentadiene resins, and terpene resins.

Optionally, one or more skin layers may be compounded with a wax or coated with a wax-containing coating, for lubricity, in amounts ranging from 2 wt % to 15 wt % based on the total weight of the skin layer. Any conventional wax, such as, but not limited to Carnauba™ wax (commercially available from Michelman Corporation of Cincinnati, Ohio) that is useful in thermoplastic films is contemplated.

Orientation

The embodiments include possible uniaxial or biaxial orientation of the multilayered films. Orientation in the direction of extrusion is known as machine direction (MD) orientation. Orientation perpendicular to the direction of extrusion is known as transverse direction (TD) orientation. Orientation may be accomplished by stretching or pulling a film first in the MD followed by TD orientation. Blown films or cast films may also be oriented by a tenter-frame orientation subsequent to the film extrusion process, again in one or both directions. Orientation may be sequential or simultaneous, depending upon the desired film features. Preferred orientation ratios are commonly from between about three to about six times the extruded width in the machine direction and between about four to about ten times the extruded width in the transverse direction. Typical commercial orientation processes are tenter process, blown film, and LISIM technology.

Surface Treatment

One or both of the outer surfaces of the multilayered films, and, in particular, the sealant layers, may be surface-treated to increase the surface energy to render the film receptive to metallization, coatings, printing inks, adhesives, and/or lamination. The surface treatment can be carried out according to one of the methods known in the art including corona discharge, flame, plasma, chemical treatment, or treatment by means of a polarized flame.

Coating

In some embodiments, one or more coatings, such as for barrier, printing and/or processing, may be applied to outer surface(s) of the multilayered films. Such coatings may include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings may be applied by an emulsion coating technique or by co-extrusion and/or lamination.

The PVdC coatings that are suitable for use with the multilayered films are any of the known PVdC compositions heretofore employed as coatings in film manufacturing operations, e.g., any of the PVdC materials described in U.S. Pat. Nos. 4,214,039, 4,447,494, 4,961,992, 5,019,447, and 5,057,177, incorporated herein by reference.

Known vinyl alcohol-based coatings, such as PVOH and EVOH, that are suitable for use with the multilayered films include VINOL™ 125 or VINOL™ 325 (both commercially available from Air Products, Inc. of Allentown, Pa.). Other PVOH coatings are described in U.S. Pat. No. 5,230,963, incorporated herein by reference.

Before applying the coating composition to the appropriate substrate, the outer surface(s) of the film may be treated as noted herein to increase its surface energy. This treatment can be accomplished by employing known techniques, such as flame treatment, plasma, corona discharge, film chlorination, e.g., exposure of the film surface to gaseous chlorine, treatment with oxidizing agents such as chromic acid, hot air or steam treatment, flame treatment and the like. Although any of these techniques is effectively employed to pre-treat the film surface, a frequently preferred method is corona discharge, an electronic treatment method that includes exposing the film surface to a high voltage corona discharge while passing the film between a pair of spaced electrodes. After treatment of the film surface, the coating composition is then applied thereto and optionally metallized.

Priming

An intermediate primer coating may be applied to multilayered films. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy, poly(ethylene imine) (PEI), and polyurethane materials. U.S. Pat. Nos. 3,753,769, 4,058,645 and 4,439,493, each incorporated herein by reference, discloses the use and application of such primers. The primer provides an overall adhesively active surface for thorough and secure bonding with the subsequently applied coating composition and can be applied to the film by conventional solution coating means, for example, by roller application.

The coating composition may be water-based emulsions that may use one or more surfactants to disperse and stabilize the polymer(s) and additives comprising the coating composition. The coating composition may be applied to the film as a solution, one prepared with an organic solvent such as an alcohol, ketone, ester, and the like. It is preferable that the coating composition be applied to the treated surface in any convenient manner, such as by gravure coating, roll coating, dipping, spraying, and the like. The excess aqueous solution can be removed by squeeze rolls, doctor knives, and the like.

Orienting

The films herein are also characterized in certain embodiments as being biaxially oriented. The films can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the tentered method. In the tentered process, line speeds of greater than 100 m/min to 400 m/min or more, and outputs of greater than 2000 kg/hr to 4000 kg/hr or more are achievable. In the tenter process, sheets/films of the various materials are melt blended and coextruded, such as through a 3, 4, 5, 7-layer die head, into the desired film structure. Extruders ranging in diameters from 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation. It is understood by those skilled in the art that this temperature range can vary depending upon the equipment, and in particular, upon the identity and composition of the components making up the film. Ideally, the temperature will be below that which will melt the film, but high enough to facilitate the machine direction orientation process. Such temperatures referred to herein refer to the film temperature itself. The film temperature can be measured by using, for example, infrared spectroscopy, the source aimed at the film as it is being processed; those skilled in the art will understand that for transparent films, measuring the actual film temperature will not be as precise. The heating means for the film line may be set at any appropriate level of heating, depending upon the instrument, to achieve the stated film temperatures.

The lengthened and thinned film is passed to the tenter section of the line for TD orientation. At this point, the edges of the sheet are grasped by mechanical clips on continuous chains and pulled into a long, precisely controlled hot air oven for a pre-heating step. The film temperatures range from 100 or 110 to 150 or 170 or 180° C. in the pre-heating step. Again, the temperature will be below that which will melt the film, but high enough to facilitate the step of transverse direction orientation. Next, the edges of the sheet are grasped by mechanical clips on continuous chains and pulled into a long, precisely controlled hot air oven for transverse stretching. As the tenter chains diverge a desired amount to stretch the film in the transverse direction, the process temperature is lowered by at least 2° C. but typically no more than 20° C. relative to the pre-heat temperature to maintain the film temperature so that it will not melt the film. After stretching to achieve transverse orientation in the film, the film is annealed at a temperature below the melting point, and the film is then cooled from 5 to 10 or 15 or 20 or 30 or 40° C. below the stretching temperature, and the clips are released prior to edge trim, optional coronal, printing and/or other treatment can then take place, followed by winding.

Thus, TD orientation is achieved by the steps of pre-heating the film having been machine oriented, followed by stretching and annealing it at a temperature below the melt point of the film, and then followed by a cooling step at yet a lower temperature. In one embodiment, the films described herein are formed by imparting a transverse orientation by a process of first pre-heating the film, followed by a decrease in the temperature of the process within the range of from 2 or 3 to 5 to 10 or 15 or 20° C. relative to the pre-heating temperature while performing transverse orientation of the film, followed by a lowering of the temperature within the range of from 5° C. to 10 or 15 or 20 or 30 or 40° C. relative to the melt point temperature, holding or slightly decreasing (more than 5%) the amount of stretch, to allow the film to anneal. The latter step imparts the low TD shrink characteristics of the films described herein. Thus, for example, where the pre-heat temperature is 120° C., the stretch temperature may be 114° C., and the cooling step may be 98° C., or any temperature within the ranges disclosed. The steps are carried out for a sufficient time to affect the desired film properties as those skilled in the art will understand.

Thus, in certain embodiments the film(s) described herein are biaxially oriented with at least a 5 or 6 or 7 or 8-fold TD orientation and at least a 2 or 3 or 4-fold MD orientation. Being so formed, the at least three-layer (one core, two skin layers, 18-21 μm thickness) possess an ultimate tensile strength within the range of from 100 or 110 to 80 or 90 or 200 MPa in the TD in certain embodiments; and possess an ultimate tensile strength within the range of from 30 or 40 to 150 or 130 MPa in the MD in other embodiments. Further, the SCS films described herein possess an MD Elmendorf tear is greater than 10 or 15 g in certain embodiments, and the TD Elmendorf tear is greater than 15 or 20 g in other embodiments.

In certain embodiments, the film(s) described herein include or exclude certain materials. In one embodiment, low density polyethylene produced in a high pressure radical-induced process (HP-LDPE) is substantially absent from the core (or composition making up the core), meaning that it is not present in any detectable amount. In another embodiment, high density polyethylene (HDPE, and having a density of greater than 0.940 g/cm$^3$) is substantially absent from the core layer (or composition making up the core). In other embodiments, the core further comprises low density polyethylene produced in a high pressure radical-induced process within the range of from 0.1 to 10 or 15 wt % based on the weight of the core layer. In yet other embodiments, cavitation and/or opacity-inducing agents are substantially absent, meaning that they are not present in the core in any detectable amount. Examples of cavitation and/or opacity-inducing agents includes calcium carbonate, talc, carbon black, clay, untreated silica and alumina, zinc oxide, mica, asbestos, barites, magnesium carbonate and mixtures thereof, as well as those materials made from polybutylene terephthalate, nylon-6, cyclic olefin copolymers particles, and other particles that are phase-distinct from the core layer material, and having a size that, during orientation, will create cavities in the core layer.

INDUSTRIAL APPLICABILITY

The disclosed multilayered films may be stand-alone films, laminates, or webs. Or, the multilayered films may be sealed, coated, metallized, and/or laminated to other film structures. The disclosed multilayered films may be prepared by any suitable methods comprising the steps of co-extruding a multilayered film according to the description and claims of this specification, orienting and preparing the film for intended use such as by coating, printing, slitting, or other converting methods.

For some applications, it may be desirable to laminate the multilayered films to other polymeric film or paper products for purposes such as package decor including printing and metallizing. These activities are typically performed by the ultimate end-users or film converters who process films for supply to the ultimate end-users.

The prepared multilayered film may be used as a flexible packaging film to package an article or good, such as a food item or other product. In some applications, the film may be formed into a pouch type of package, such as may be useful for packaging a beverage, liquid, granular, or dry-powder product.

EXPERIMENTAL

As non-limiting examples, the following transparent biaxially oriented polyethylene films were produced having the structures described in Table 1.

TABLE 1

|  | Example 1 | Example 2 | Example 3 |
|---|---|---|---|
| treatment | corona-discharge | corona-discharge | corona-discharge |
| metallizable layer (1 μm) | m-LLDPE | propylene-ethylene copolymer[1] | ethylene-propylene-butene terpolymer[2] |
| core layer (23 μm) | m-LLDPE | m-LLDPE | m-LLDPE |
| sealant layer (1 μm) | m-LLDPE + 1000 ppm zeolite (5 μm) | m-LLDPE + 1000 ppm zeolite (5 μm) | m-LLDPE + 1000 ppm zeolite (5 μm) |

[1] e.g., Total Petrochemicals 8573
[2] e.g., LyondellBasell Adsyl™ 5C39F

The following properties were measured for these oriented m-LLDPE films and reported in Table 2.

TABLE 2

|  | Example 1 | Example 2 | Example 3 |
|---|---|---|---|
| yield | 36.4 m²/kg | 38.1 m²/kg | 36.2 m²/kg |
| optical gauge (ASTM D6988-08) | 29.2 μm | 28.7 μm | 38.4 μm |
| Haze (ASTM D1003 standard) | 4.6% | 3.1% | 3.8% |
| Elastic Modulus MD (ASTM D882 standard) | 197 N/mm² | 248 N/mm² | 238 N/mm² |
| Elastic Modulus TD (ASTM D882 standard) | 303 N/mm² | 286 N/mm² | 252 N/mm² |

Although the films were corona-discharge treated, the oriented m-LLDPE films could have undergone any other type of surface treatment. Following corona-discharge treatment, the oriented m-LLDPE films were plasma-treated in an 80%/20% argon/oxygen environment and then metallized by vacuum deposition of aluminum. Thereafter, optical density, water-vapor transmission rate ("WVTR") and oxygen transmission rate ("OTR") were measured for these oriented, metallized, m-LLDPE films and reported in Table 3, whereby the films showed good water and oxygen barrier properties.

TABLE 3

|  | Example 1 | Example 2 | Example 3 |
|---|---|---|---|
| optical density (AIMCAL TP-101-78 standard) | 2.2 | 2.2 | 2.2 |
| WVTR 38° C./90% RH (ASTM F1249 standard) | 0.46 g/m² d | 0.35 g/m² d | 1.55 g/m² d |
| OTR 23° C./0% RH (ASTM D3895 standard) | 58 cm³/m² d | 51 cm³/m² d | 85 cm³/m² d |

The film of Example 1 was EVOH-coated, as described, for example, in paragraph [0048], and used Kuraray AQ4104 dispersed at 6% in water. This coating was applied using a gravure roll at 0.4 g/m². The EVOH-coated layer was then metallized, i.e., Example 5, and the below properties were measured:
OD: 2.3;
WVTR: 0.27 g/m² d; and
OTR: 69 cm³/m² d.

Oriented, metallized, m-LLDPE films, just like the ones in Table 3, were laminated to 12 μm polyethylene terephthalate, and the properties in Table 4 were measured. The films in Table 4 exhibited good water and oxygen barrier properties after lamination.

TABLE 4

|  | Example 1 | Example 2 | Example 3 | Example 5 |
|---|---|---|---|---|
| WVTR 38° C./90% RH (ASTM F1249 standard) | 0.27 g/m² d | 0.88 g/m² d | 2.0 g/m² d | 1.4 g/m² d |
| OTR 23° C./0% RH (ASTM D3895 standard) | 28 cm³/m² d | 65 cm³/m² d | 137 cm³/m² d | <0.10 cc/m² d |
| Adhesive bonds | tearing | 10 g/inch | 15 g/inch | cannot be delaminated |

Adhesive bond strength may be measured by cutting a one inch wide strip from a laminate structures and peeling the primary web and the secondary web apart at 12 inches/min. and 90 degrees peel angle on an Instron tensile tester (commercially available from Instron Worldwide Headquarters, Norwood, Mass.). The bond strength is the maximum peel force measured by the test.

For comparative purposes, a 37 μm, non-oriented, metallized, m-LLDPE film was laminated to 12 μm polyethylene terephthalate, and the following properties were measured and reported in Table 5.

TABLE 5

|  | Example 4 |
|---|---|
| WVTR 38° C./90% RH (ASTM F1249 standard) | 2.0 g/m² d |
| OTR 23° C./0% RH (ASTM D3895 standard) | 29 cm³/m² d |

Here, the results showed that the non-oriented, metallized, m-LLDPE film provided a good oxygen barrier, but a poor water barrier.

Turning now to Table 6, reported are sealing properties of the oriented, metallized, m-LLDPE films that were laminated to 12 μm polyethylene terephthalate, i.e., just like the ones in Table 4. Using standard testing method of ASTM F2029, an Ottobrugger sealer with crimp jaws was used at a pressure of 410 kPa and a dwell time of 0.75 sec over a range of temperatures from 90° C. to 150° C. on the laminates. The results show that biaxially oriented, metallized LLDPE film laminated to polyethylene terephthalate provide high seal strengths.

TABLE 6

| Jaw Temperature | Example 1 | Example 2 | Example 3 | Example 5 |
|---|---|---|---|---|
| 90° C. | 0 g/inch | 0 g/inch | 10 g/inch | 0 g/inch |
| 100° C. | 20 g/inch | 20 g/inch | 20 g/inch | 465 g/inch |
| 110° C. | 30 g/inch | 40 g/inch | 20 g/inch | 1735 g/inch |
| 120° C. | 380 g/inch | 530 g/inch | 440 g/inch | 1525 g/inch |
| 130° C. | 3240 g/inch | 1780 g/inch | 1680 g/inch | 2585 g/inch |
| 140° C. | 3200 g/inch | 2160 g/inch | 2460 g/inch | 4085 g/inch |
| 150° C. | 5190 g/inch | 2160 g/inch | 2350 g/inch | 4830 g/inch |

In view of the foregoing, various bags, packages, pouches (e.g., stand-up, vertical fill-and-seal, horizontal fill-and-seal, etc.), films, laminates, and other structures may be formed from the above-described films, wherein such may have products (e.g., food, beverages) of any phase that require seals having requisite integrity and/or barriers to water and/or oxygen transmission.

While the foregoing is directed to example embodiments of the disclosed invention, other and further embodiments may be devised without departing from the basic scope thereof, wherein the scope of the disclosed apparatuses, systems and methods are determined by one or more claims.

What is claimed is:

1. A multi-layered film comprising:
   a metallizable skin layer consisting of metallocene-catalyzed, linear, low-density polyethylene and an antiblocking agent, wherein the metallizable skin layer is treated one or more times;
   a core layer consisting of metallocene-catalyzed, linear, low-density polyethylene, and, optionally, a cavitating agent;
   a sealant layer consisting of metallocene-catalyzed, linear, low-density polyethylene;
   a water-based EVOH or PVOH coated layer on the metallizable skin layer; and
   at least one additive in the sealant layer,
   wherein the core layer is located between the metallizable skin layer and the sealant layer,
   wherein the metallizable skin layer, the core layer and the sealant layer are coextruded and biaxially oriented with a haze equal to or below 5% using ASTM D1003, and an elastic modulus equal to or below 350 N/mm$^2$ using ASTM D8882, and
   wherein the core layer is at least 25 times thicker than each of: (i) the metallizable skin layer; and (ii) the sealant layer.

2. The multi-layered film of claim 1, further comprising a metallized layer on the water-based EVOH or PVOH coated layer.

3. The multi-layered film of claim 2, wherein the multi-layered film has an optical density equal to or below 2.5 using AIMCAL TP-101-78.

4. The multi-layered film of claim 1, wherein the multi-layered film without the water-based EVOH or PVOH coated layer has a water vapor transmission rate equal to or below 1.6 g/m$^2$ d at 38° C. and 90% relative humidity using ASTM F1249.

5. The multi-layered film of claim 1, wherein the core layer consists of the metallocene-catalyzed, linear, low-density polyethylene and no additives.

6. The multi-layered film of claim 1, wherein the multi-layered film without the water-based EVOH or PVOH coated layer has an oxygen transmission rate equal to or below 100 cm$^3$/m$^2$ d at 23° C. and 0% relative humidity using ASTM D3895.

7. The multi-layered film of claim 1, wherein the multi-layered film without the water-based EVOH or PVOH coated layer has a water vapor transmission rate equal to or below 0.5 g/m$^2$ d at 38° C. and 90% relative humidity using ASTM F1249.

8. The multi-layered film of claim 1, wherein the multi-layered film without the water-based EVOH or PVOH coated layer has an oxygen transmission rate equal to or below 70 cm$^3$/m$^2$ d at 23° C. and 0% relative humidity using ASTM D3895.

9. The multi-layered film of claim 1, wherein the multi-layered film has a seal strength of at least 380 g/inch at 120° C. using ASTM F2029.

10. The multi-layered film of claim 1, wherein the multi-layered film has a seal strength of at least 1680 g/inch at 130° C. using ASTM F2029.

11. The multi-layered film of claim 1, wherein the multi-layered film has a seal strength of at least 2160 g/inch at 140° C. using ASTM F2029.

12. The multi-layered film of claim 1, wherein the multi-layered film has a water vapor transmission rate equal to or below 2.0 g/m$^2$ d at 38° C. and 90% relative humidity using ASTM F1249.

13. The multi-layered film of claim 1, wherein the multi-layered film has an oxygen transmission rate equal to or below 140 cm$^3$/m$^2$ d at 23° C. and 0% relative humidity using ASTM F1249.

14. The multi-layered film of claim 1, wherein multi-layered film has an optical gauge equal to or less than 40 μm using ASTM D6988-08.

15. The multi-layered film of claim 1, wherein multi-layered film has an optical gauge equal to or less than 30 μm using ASTM D6988-08.

16. The multi-layered film of claim 1, further comprising one or more tie layers, optionally having additives.

17. A package comprising the multi-layered film of claim 2.

18. A package comprising the multi-layered film of claim 1.

19. The multi-layered film of claim 1, wherein the antiblocking agent in the sealant layer comprises zeolite.

20. The multi-layered film of claim 1, further comprising a laminate adhered to the multi-layered film.

* * * * *